(12) United States Patent
Tsuei

(10) Patent No.: US 10,649,284 B2
(45) Date of Patent: May 12, 2020

(54) LIQUID CRYSTAL DISPLAY PANEL AND LIQUID CRYSTAL DISPLAY DEVICE

(71) Applicant: SHENZHEN CHINA STAR OPTOELECTRONICS TECHNOLOGY CO., LTD., Guangdong (CN)

(72) Inventor: Bochin Tsuei, Guangdong (CN)

(73) Assignee: SHENZHEN CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 699 days.

(21) Appl. No.: 15/327,327

(22) PCT Filed: Dec. 28, 2016

(86) PCT No.: PCT/CN2016/112534
§ 371 (c)(1),
(2) Date: Jan. 18, 2017

(87) PCT Pub. No.: WO2018/103156
PCT Pub. Date: Jun. 14, 2018

(65) Prior Publication Data
US 2019/0384122 A1  Dec. 19, 2019

(30) Foreign Application Priority Data

Dec. 7, 2016 (CN) .......................... 2016 1 1116745

(51) Int. Cl.
*G02F 1/1343* (2006.01)
*G02F 1/1337* (2006.01)
*G02F 1/1335* (2006.01)

(52) U.S. Cl.
CPC .. *G02F 1/134309* (2013.01); *G02F 1/133528* (2013.01); *G02F 1/133753* (2013.01);
(Continued)

(58) Field of Classification Search
CPC ... G02F 2001/133757; G02F 2201/122; G02F 2001/133761; G02F 1/133753; G02F 1/134309; G02F 1/1337; G02F 1/134363
See application file for complete search history.

(56) References Cited

U.S. PATENT DOCUMENTS

2005/0264743 A1    12/2005 Suzuki et al.
2012/0320323 A1*   12/2012 Kim .................. G02F 1/133753
                                                         349/127
(Continued)

FOREIGN PATENT DOCUMENTS

CN            1181517 A      5/1998
CN          102621753 A      8/2012
(Continued)

Primary Examiner — Paisley L Wilson
Assistant Examiner — Mariam Qureshi
(74) Attorney, Agent, or Firm — WPAT, PC

(57) ABSTRACT

A liquid crystal display panel and a liquid crystal display device are provided. The liquid crystal display panel includes a first substrate having a plurality of pixel electrodes. Each of the pixel electrodes includes a horizontal trunk electrode and a vertical trunk electrode through which a pixel unit corresponding to the pixel electrode is divided into four light-transmitting areas, and two adjacent light-transmitting areas have different alignment directions. The pixel electrode also includes a plurality of branch electrodes located in the four light-transmitting areas. The branch electrodes are parallel to the horizontal trunk electrode or the vertical trunk electrode.

17 Claims, 5 Drawing Sheets

(52) U.S. Cl.
CPC ............ *G02F 2001/133757* (2013.01); *G02F 2001/133761* (2013.01); *G02F 2201/122* (2013.01); *G02F 2201/123* (2013.01)

(56) References Cited

U.S. PATENT DOCUMENTS

| | | | |
|---|---|---|---|
| 2015/0049269 A1* | 2/2015 | Okazaki | G02F 1/134363 |
| | | | 349/33 |
| 2015/0098038 A1 | 4/2015 | Nishida et al. | |
| 2015/0261045 A1* | 9/2015 | Kim | G02F 1/134309 |
| | | | 349/123 |
| 2016/0154280 A1* | 6/2016 | Yang | G02F 1/134309 |
| | | | 349/96 |
| 2016/0266442 A1* | 9/2016 | Kuboki | G02F 1/133753 |
| 2017/0031212 A1* | 2/2017 | Ho | G02F 1/133707 |

FOREIGN PATENT DOCUMENTS

| | | |
|---|---|---|
| CN | 103135293 A | 6/2013 |
| CN | 104160326 A | 11/2014 |
| CN | 105705988 A | 6/2016 |

\* cited by examiner

LIQUID CRYSTAL DISPLAY PANEL AND LIQUID CRYSTAL DISPLAY DEVICE

FIELD OF THE DISCLOSURE

The present disclosure relates to a field of liquid crystal display panels, and more particularly to a liquid crystal display panel and a liquid crystal display device.

BACKGROUND

UV2A (ultraviolet vertical alignment) is a technology which uses ultraviolet light to align the liquid crystals of a liquid crystal display panel with a vertical alignment. The principle is that an alignment film is coated on a glass substrate, where the alignment film is made by UV-reactive polymer materials. Under the irradiation of ultraviolet light, a polymeric backbone chain on a surface of the alignment film is inclined in the direction of ultraviolet irradiation, so that the liquid crystal molecule can tilt in the direction of the backbone chain. This technology is mainly used in vertical alignment mode liquid crystal displays with a large viewing angle, so as to improve an aperture ratio, a contrast ratio, a response speed, and other characteristics of the liquid crystal displays with large viewing angles.

FIG. 1 is a schematic diagram showing a swastika-shaped dark streak in a liquid crystal display panel of the prior art. Due to the UV2A technology using a special orthometric photoalignment, the "卐" (swastika-shaped) dark streak is formed on a sub-pixel when the liquid crystal display panel is in a bright state. The appearance of the swastika-shaped dark streak will reduce light transmittance of the liquid crystal display panel. Furthermore, the existing liquid crystal display panel will have a serious washout (commonly known as white washing) problem when viewed from a side. That is, when viewed from the side, since the screen turns white as the brightness becomes higher, display quality will significantly decrease.

Accordingly, it is necessary to provide a liquid crystal display panel and a liquid crystal display device to solve the technical problem in the prior art.

SUMMARY OF THE DISCLOSURE

An object of the present disclosure is to provide a liquid crystal display panel to solve the technical problem caused from the appearance of a swastika-shaped dark streak appearing in an existing liquid crystal display panel, thereby reducing light transmittance of the liquid crystal display panel and having a washout problem when viewed from a side.

In order to solve the above problems, the present disclosure provides the following technical solutions.

The present disclosure provides a liquid crystal display panel, comprising: a first substrate, a second substrate, and a liquid crystal layer disposed between the first substrate and the second substrate.

A plurality of pixel electrodes are disposed on the first substrate, each of the pixel electrodes comprises a horizontal trunk electrode and a vertical trunk electrode, a pixel unit corresponding to the pixel electrode is divided into four light-transmitting areas through the horizontal trunk electrode and the vertical trunk electrode, and two adjacent light-transmitting areas have different alignment directions.

The pixel electrode also comprises a plurality of branch electrodes disposed on the four light-transmitting areas, the branch electrodes are parallel to the horizontal trunk electrode or the vertical trunk electrode, so that the alignment direction in the light-transmitting area is parallel to the branch electrodes in the light-transmitting area.

The branch electrodes of the two adjacent light-transmitting areas are perpendicular to each other; ends of the branch electrodes in the same light-transmitting area are connected together to the vertical trunk electrode or the horizontal trunk electrode.

In the liquid crystal display panel of the present disclosure, the alignment directions of the four light-transmitting areas comprise horizontal leftward, vertical downward, horizontal rightward, and vertical upward.

In the liquid crystal display panel of the present disclosure, a width of the horizontal trunk electrode and the vertical trunk electrode is between 3 μm to 8 μm.

In the liquid crystal display panel of the present disclosure, a width of the branch electrode is between 2 μm to 4 μm.

In the liquid crystal display panel of the present disclosure, a distance between two adjacent branch electrodes which are located in the same light-transmitting area is between 2 μm to 4 μm.

In the liquid crystal display panel of the present disclosure, the liquid crystal display panel further comprises a first polarizer and a second polarizer, where the first polarizer is disposed on the first substrate, and the second polarizer is disposed on the second substrate, and an angle between the first polarizer and the branch electrodes is 45 degrees.

In the liquid crystal display panel of the present disclosure, an angle between the first polarizer and the second polarizer is 90 degrees.

The present disclosure also provides a liquid crystal display panel, comprising: a first substrate, a second substrate, and a liquid crystal layer disposed between the first substrate and the second substrate.

A plurality of pixel electrodes are disposed on the first substrate, each of the pixel electrodes comprises a horizontal trunk electrode and a vertical trunk electrode, a pixel unit corresponding to the pixel electrode is divided into four light-transmitting areas through the horizontal trunk electrode and the vertical trunk electrode, and two adjacent light-transmitting areas have different alignment directions.

The pixel electrode also comprises a plurality of branch electrodes disposed in the four light-transmitting areas, the branch electrodes are parallel to the horizontal trunk electrode or the vertical trunk electrode, so that the alignment direction in the light-transmitting area is parallel to the branch electrodes in the light-transmitting area.

In the liquid crystal display panel of the present disclosure, the branch electrodes of the two adjacent light-transmitting areas are perpendicular to each other.

In the liquid crystal display panel of the present disclosure, the alignment directions of the four light-transmitting areas comprise horizontal leftward, vertical downward, horizontal rightward, and vertical upward.

In the liquid crystal display panel of the present disclosure, ends of the branch electrodes in the same light-transmitting area are connected together to the vertical trunk electrode or the horizontal trunk electrode.

In the liquid crystal display panel of the present disclosure, a width of the horizontal trunk electrode and the vertical trunk electrode is between 3 μm to 8 μm.

In the liquid crystal display panel of the present disclosure, a width of the branch electrode is between 2 μm to 4 μm.

In the liquid crystal display panel of the present disclosure, a distance between two adjacent branch electrodes which are located in the same light-transmitting area is between 2 μm to 4 μm.

In the liquid crystal display panel of the present disclosure, the liquid crystal display panel further comprises a first polarizer and a second polarizer, where the first polarizer is disposed on the first substrate, and the second polarizer is disposed on the second substrate, and an angle between the first polarizer and the branch electrodes is 45 degrees.

In the liquid crystal display panel of the present disclosure, an angle between the first polarizer and the second polarizer is 90 degrees.

According to the above object, the present disclosure also provides a liquid crystal display device, comprising a liquid crystal display panel, where the liquid crystal display panel comprises a first substrate, a second substrate, and a liquid crystal layer disposed between the first substrate and the second substrate.

A plurality of pixel electrodes are disposed on the first substrate, each of the pixel electrodes comprises a horizontal trunk electrode and a vertical trunk electrode, a pixel unit corresponding to the pixel electrode is divided into four light-transmitting areas through the horizontal trunk electrode and the vertical trunk electrode, and two adjacent light-transmitting areas have different alignment directions.

The pixel electrode also comprises a plurality of branch electrodes disposed on the four light-transmitting areas, the branch electrodes are parallel to the horizontal trunk electrode or the vertical trunk electrode, so that the alignment direction in the light-transmitting area is parallel to the branch electrodes in the light-transmitting area.

In the liquid crystal display device of the present disclosure, the branch electrodes of the two adjacent light-transmitting areas are perpendicular to each other.

In the liquid crystal display device of the present disclosure, the alignment directions of the four light-transmitting areas comprise horizontal leftward, vertical downward, horizontal rightward, and vertical upward.

In the liquid crystal display device of the present disclosure, ends of the branch electrodes in the same light-transmitting area are connected together to the vertical trunk electrode or the horizontal trunk electrode.

In comparison to the prior art, in the liquid crystal display panel of the present disclosure, through dividing a pixel electrode into a horizontal trunk electrode, a vertical trunk electrode, and a plurality of branch electrodes, a dark streak appearing in the liquid crystal display panel can be weakened so as to increase light transmittance of the liquid crystal display panel, and a washout problem in the prior art liquid crystal display panel can be improved when viewed from a side, such that the liquid crystal display panel has a better side-viewing effect.

In order to make the present disclosure more clear, preferred embodiments and the drawings thereof are described in detail below.

BRIEF DESCRIPTION OF THE DRAWINGS

The technical solution and the beneficial effects of the present disclosure are best understood from the following detailed description with reference to the accompanying drawings and embodiments.

DETAILED DESCRIPTION

To further expound the technical solution adopted in the present disclosure and the advantages thereof, a detailed description is given of a preferred embodiment of the present disclosure and the attached drawings.

Figure 1:
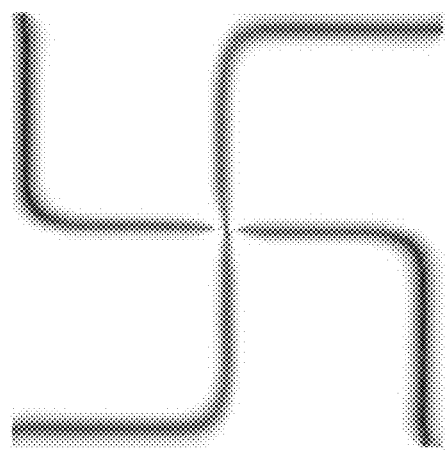
FIG. 1 is a schematic diagram showing a swastika-shaped dark streak in a liquid crystal display panel of the prior art.
Figure 2:
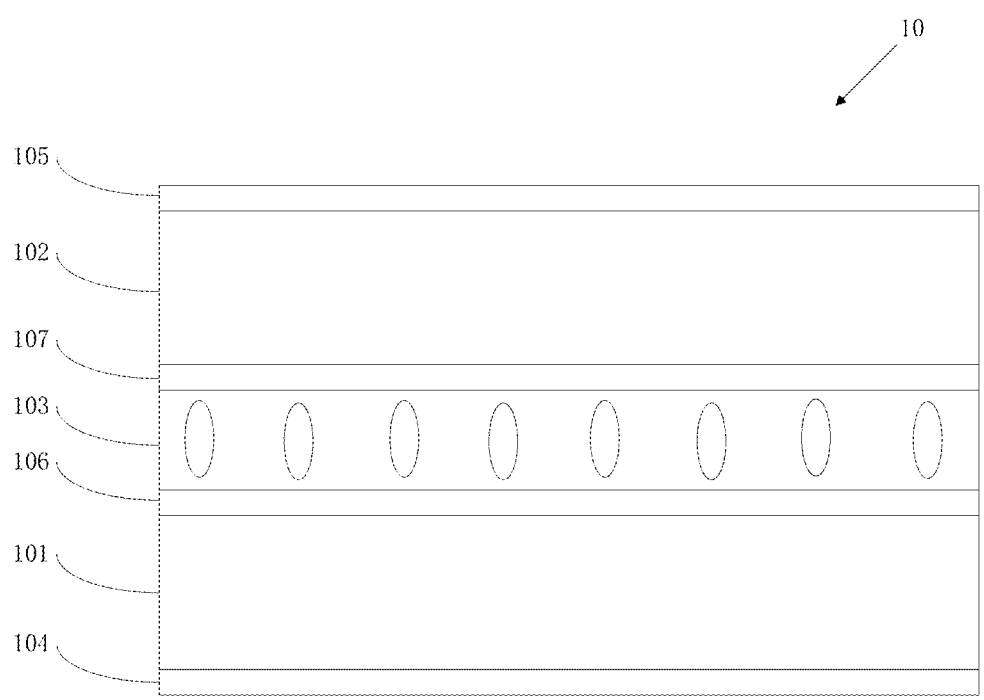
FIG. 2 is a structural diagram of a preferred embodiment of a liquid crystal display panel of the present disclosure.
Figure 3:
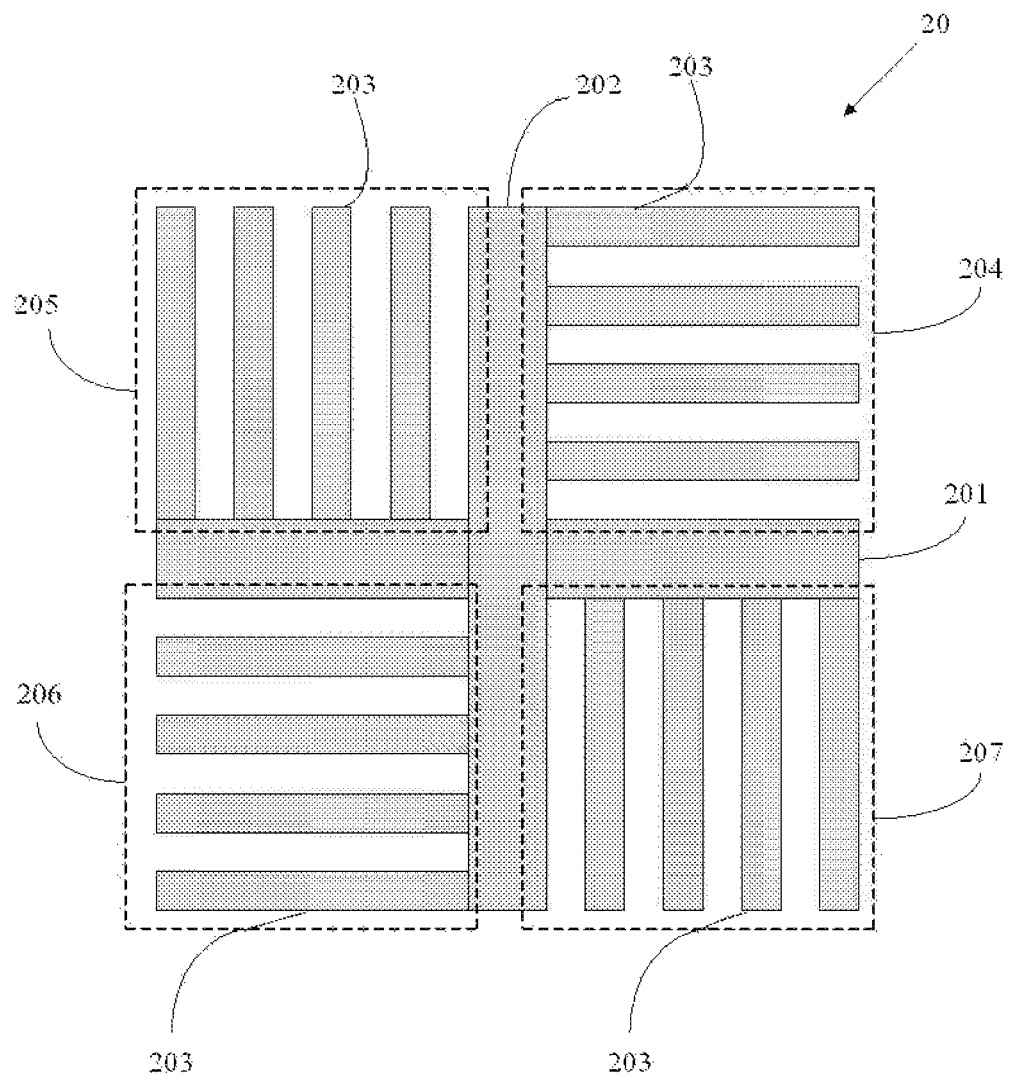
FIG. 3 is a structural diagram of a pixel electrode corresponding to a pixel unit according to a preferred embodiment of a liquid crystal display panel of the present disclosure.

FIG. 2 is a structural diagram of a preferred embodiment of a liquid crystal display panel of the present disclosure. FIG. 3 is a structural diagram of a pixel electrode corresponding to a pixel unit according to a preferred embodiment of a liquid crystal display panel of the present disclosure.

In this preferred embodiment, the liquid crystal display pane 10 includes a first substrate 101, a second substrate 102, a liquid crystal layer 103, a first polarizer 104, a second polarizer 105, a first alignment film 106, and a second alignment film 107. The first polarizer 104 is located on an outside of the first substrate 101. The first alignment film 106 is located on an inside of the first substrate 101. The second polarizer 105 is located on an outside of the second substrate 102. The second alignment film 107 is located on an inside of the second substrate 102.

A plurality of pixel electrodes 20 are disposed on the first substrate 101. Each pixel electrode 20 corresponds to a pixel unit, where each pixel electrode 20 includes a horizontal trunk electrode 201 and a vertical trunk electrode 202. The pixel unit corresponding to the pixel electrode is divided into four light-transmitting areas through the horizontal trunk electrode 201 and the vertical trunk electrode 202. Two adjacent light-transmitting areas have different alignment directions. The pixel electrode 20 also includes a plurality of branch electrodes 203 located on the four light-transmitting areas. The branch electrodes 203 are parallel to the horizontal trunk electrode 201 or the vertical trunk electrode 202, such that the alignment direction in the light-transmitting area is parallel to the branch electrodes in the light-transmitting area.

The branch electrodes 203 in the two adjacent light-transmitting areas are perpendicular to each other. Specifically, the four light-transmitting areas include a first light-transmitting area 204, a second light-transmitting area 205, a third light-transmitting area 206, and a fourth light-transmitting area 207. The branch electrodes 203 in the first light-transmitting area 204 and the third light-transmitting area 206 are parallel to horizontal trunk electrode 201. Ends of the branch electrodes 203 in the first light-transmitting area 204 and ends of the branch electrodes 203 in the third light-transmitting area 206 are connected together to the vertical trunk electrode 202. The branch electrodes 203 in the second light-transmitting area 205 and the fourth light-transmitting area 207 are parallel to the vertical trunk electrode 202. Ends of the branch electrodes 203 in the second light-transmitting area 205 and ends of the branch electrodes 203 in the fourth light-transmitting area 20 are connected together to the horizontal trunk electrode 201.

Preferably, a width of the horizontal trunk electrode 201 and the vertical trunk electrode 202 is between 3 μm to 8 μm. A width of the branch electrode 203 in the four light-transmitting areas is between 2 μm to 4 μm. There is a slit 208 between the two adjacent branch electrodes 203 in the same light-transmitting area. A width of the slit 208 is between 2 μm to 4 μm.

In this preferred embodiment, the pixel electrode 20 is divided into the horizontal trunk electrode 201, the vertical trunk electrode 202, and the plurality of branch electrodes 203, and there is a slit 208 between the branch electrodes 203 in the same light-transmitting area. Hence, the electric field at slit 208 will induce the corresponding deflection of the liquid crystal molecule, thereby increasing light transmittance, and weakening the dark streak appearing in the liquid crystal display panel.

Furthermore, in this preferred embodiment, the alignment directions of the four light-transmitting areas include a horizontal direction and a vertical direction. Specifically, the alignment direction of the first light-transmitting area is directed horizontally leftward, the alignment direction of the second light-transmitting area is directed vertically downward, the alignment direction of the third light-transmitting area is directed horizontally rightward, and the alignment direction of the third light-transmitting area is directed vertically upward. The principle of forming different alignment directions in the four light-transmitting areas is as follows.

Figure 4:
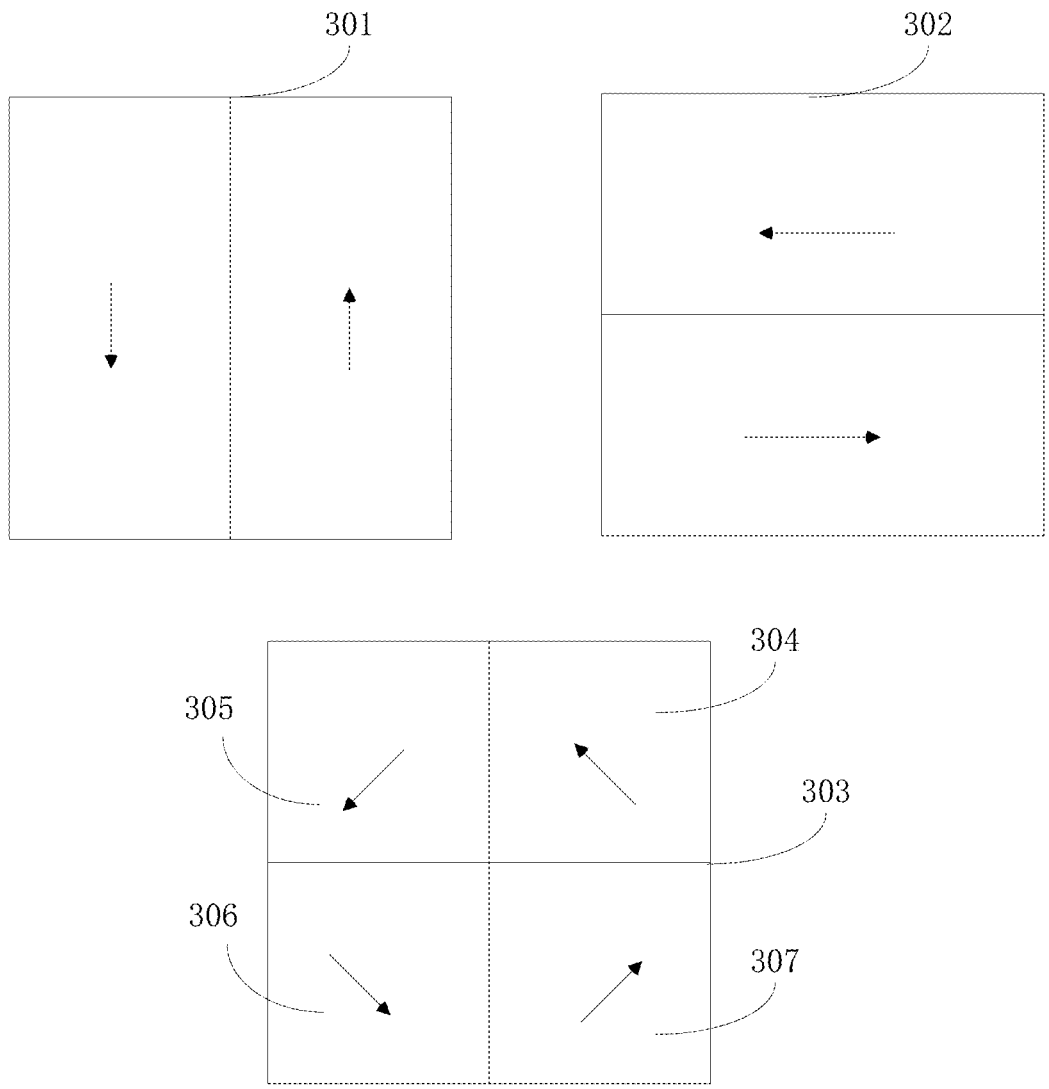
FIG. 4 is a schematic diagram showing pre-tilt angle according to a preferred embodiment of a liquid crystal display panel of the present disclosure.

FIG. 4 is a schematic diagram showing pre-tilt angle according to a preferred embodiment of a liquid crystal display panel of the present disclosure. By using the UV2A technology, the first alignment film 301 and the second alignment film 302 include two pre-tilt angle directions including a horizontal direction and a vertical direction. The pre-tilt angle direction of the first alignment film 301 includes a vertical downward direction and a vertical upward direction which are alternately arranged. The pre-tilt angle direction of the second alignment film 302 includes a horizontal leftward direction and a horizontal rightward direction which are alternately arranged. Each pixel unit includes a pair of vertically downward and vertically upward pre-tilt angle directions of the first alignment film 301 and a pair of horizontal leftward and horizontal rightward pre-tilt direction second alignment film 302. Therefore, each pixel unit 303 includes four pre-tilt angle direction domains which are an upper left domain 304, a lower left domain 305, a lower right domain 306, and an upper right domain 307. For example, in the upper left domain 304, the pre-tilt angle direction of the first alignment film 301 is vertically upward, the pre-tilt angle direction of the second alignment film 302 is horizontally leftward, so that in the upper left domain 304, the pre-tilt angle direction of the alignment direction of the liquid crystal molecule will tilt to the upper left. Similarly, in another domain, the alignment direction of the liquid crystal molecule is known, referring to FIG. 4, and will not be described in detail herein.

Then, in combination with the structure of the pixel electrode (see FIG. 3), the different alignment directions within the four light-transmitting areas are formed when the liquid crystal display panel is in a bright state. Specifically, the upper left domain 304 corresponds to the pixel electrode of the first light-transmitting area 204, where the pixel electrode includes a right half of the horizontal trunk electrode 201, an upper half of the vertical trunk electrode 202, and the plurality of branch electrodes 203 which are parallel to the horizontal trunk electrode 201, thereby forming a horizontal leftward alignment direction in the first light-transmitting area 204. The lower left domain 305 corresponds to the pixel electrode of the second light-transmitting area 205, where the pixel electrode includes a left half of the horizontal trunk electrode 201, the upper half of the vertical trunk electrode 202, and the plurality of branch electrodes 203 which are parallel to the vertical trunk electrode 202, thereby forming a vertical downward alignment direction in the second light-transmitting area 205. The lower right domain 306 corresponds to the pixel electrode of the third light-transmitting area 206, where the pixel electrode includes the left half of the horizontal trunk electrode 201, a lower half of the vertical trunk electrode 202, and the plurality of branch electrodes 203 which are parallel to the horizontal trunk electrode 201, thereby forming a horizontal rightward alignment direction in the third light-transmitting area 206. The upper right domain 307 corresponds to the pixel electrode of the fourth light-transmitting area 207, where the pixel electrode includes the right half of the horizontal trunk electrode 201, the lower half of the vertical trunk electrode 202, and the plurality of branch electrodes 203 which are parallel to the vertical trunk electrode 202, thereby forming a vertical upward alignment direction in the fourth light-transmitting area 207.

Preferably, an angle between the first polarizer and the branch electrodes is 45 degrees, and an angle between the first polarizer and the second polarizer is 90 degrees, such that the liquid crystal display panel can obtain a higher light transmittance.

Figure 5:
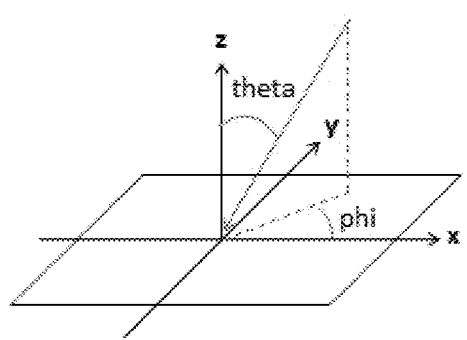
FIG. 5 is a schematic diagram showing an orientation direction of liquid crystal molecule according to a preferred embodiment of a liquid crystal display panel of the present disclosure.

FIG. 5 is a schematic diagram showing an orientation direction of liquid crystal molecules according to a preferred embodiment of a liquid crystal display panel of the present disclosure. A first direction X, a second direction Y, and a third direction Z are shown in the drawings, and the first direction X, the second direction Y, and the third direction Z are substantially perpendicular to each other. The first direction X is substantially parallel to the extending direction of scanning lines of the display panel, and the second direction Y is substantially parallel to the extending direction of data lines of the display panel, and the third direction Z is the direction being perpendicular to the first direction X and the second direction Y.

When the pixel unit is in a bright state and a phi angle of a final position of the liquid crystal molecule and an angle of the first polarizer is 45/135/225/315 degrees, and a theta angle is 90 degrees, the light transmittance of the liquid crystal molecule is the best (the phi angle is the angle between the projection of the long axis of the liquid crystal molecule in the X-Y plane and the X direction, and the theta angle is the angle between the long axis direction of the liquid crystal molecule and the Z direction). In this embodiment, data voltage is transmitted to the pixel unit by a data line, and through a resultant electric field generated between the pixel electrode and the common electrode and a projection component of the liquid crystal molecule in the X-Y plane, the long axis of the liquid crystal molecule (in the bright state) is tilted at 45/135/225/315 degrees to the first polarizer, such that the light transmittance of the liquid crystal molecule is the best.

In addition, in the prior art liquid crystal display panel, when the liquid crystal molecule is driven by an electric field, the theta angle will change to 90 degrees depending on the gray scale. However, when the phi angle being driven in different gray levels is directly towards 45/135/225/315 degrees, it will not change with the different gray scale. In the present disclosure, by the design of the pixel electrode and the alignment direction, the phi angle of the liquid crystal molecule gradually changes to 45/135/225/315 degrees with the gray scale, which makes the display panel have an IPS type or a FFS type optical characteristic. In other words, the theta angle and the phi angle of the liquid crystal molecule corresponding to the pixel electrode of the present embodiment are changed at the same time in the bright state, thereby improving the washout problem of the prior art liquid crystal display panel, making the liquid crystal display panel have better side-viewing effects.

In the liquid crystal display panel of the present disclosure, by dividing the pixel electrode into the horizontal trunk electrode, the vertical trunk electrode, and the plurality of branch electrodes, a dark streak appearing in the liquid crystal display panel can be weakened so as to increase light transmittance of the liquid crystal display panel, and a washout problem in the prior art liquid crystal display panel can be improved when viewed from a side, such that the liquid crystal display panel has a better side-viewing effect.

The present disclosure also provides a liquid crystal display device, which includes a backlight source and a liquid crystal display panel. The liquid crystal display panel includes a first substrate, a second substrate, and a liquid crystal layer disposed between the first substrate and the second substrate. A plurality of pixel electrodes are disposed on the first substrate. Each of the pixel electrodes includes a horizontal trunk electrode and a vertical trunk electrode. A pixel unit corresponding to the pixel electrode is divided into four light-transmitting areas through the horizontal trunk electrode and the vertical trunk electrode, and two adjacent light-transmitting areas have different alignment directions. The pixel electrode also includes a plurality of branch electrodes disposed on the four light-transmitting areas. The branch electrodes are parallel to the horizontal trunk electrode or the vertical trunk electrode.

The branch electrodes of the two adjacent light-transmitting areas are perpendicular to each other. A width of the horizontal trunk electrode and the vertical trunk electrode is between 3 μm to 8 μm. A width of the branch electrode is between 2 μm to 4 μm. A distance between of two adjacent branch electrodes in the same light-transmitting area is between 2 μm to 4 μm. Ends of the branch electrodes are connected together to the vertical trunk electrode or the horizontal trunk electrode. The alignment directions include a horizontal direction and a vertical direction.

The liquid crystal display panel also includes a first polarizer and a second polarizer. The first polarizer is disposed on the first substrate. The second polarizer is disposed on the second substrate. An angle between the first polarizer and the branch electrodes is 45 degrees. An angle between the first polarizer and the second polarizer is 90 degrees.

In this preferred embodiment, the specific structure and working principle of the liquid crystal display device are the same as or similar to the preferred embodiments of the liquid crystal display panel described above. For details, refer to the description in the preferred embodiment of the liquid crystal display panel described above.

In the liquid crystal display panel and the liquid crystal display device of the present disclosure, through dividing a pixel electrode into a horizontal trunk electrode, a vertical trunk electrode, and a plurality of branch electrodes, a dark streak appearing in the liquid crystal display panel can be weakened so as to increase light transmittance of the liquid crystal display panel, and a washout problem in the prior art liquid crystal display panel can be improved when viewed from a side, such that the liquid crystal display panel has a better side-viewing effect.

The above descriptions are merely preferable embodiments of the present disclosure, and are not intended to limit the scope of the present disclosure. Any modification or replacement made by those skilled in the art without departing from the spirit and principle of the present disclosure should fall within the protection scope of the present disclosure. Therefore, the protection scope of the present disclosure is subject to the appended claims.

What is claimed is:

1. A liquid crystal display panel, comprising: a first substrate, a second substrate, a liquid crystal layer disposed between the first substrate and the second substrate, a first alignment film disposed between the first substrate and the liquid crystal layer, and a second alignment film disposed between the second substrate and the liquid crystal layer;

wherein a plurality of pixel electrodes are disposed on the first substrate, each of the pixel electrodes comprises a horizontal trunk electrode and a vertical trunk electrode, a pixel unit corresponding to the pixel electrode is divided into four light-transmitting areas through the horizontal trunk electrode and the vertical trunk electrode, and two adjacent light-transmitting areas have different alignment directions;

wherein the pixel electrode also comprises a plurality of branch electrodes disposed in the four light-transmitting areas, the branch electrodes are parallel to the horizontal trunk electrode or the vertical trunk electrode, so that the alignment direction in the light-transmitting area is parallel to the branch electrodes in the light-transmitting area;

wherein the branch electrodes of the two adjacent light-transmitting areas are perpendicular to each other; ends of the branch electrodes in the same light-transmitting area are connected together to the vertical trunk electrode or the horizontal trunk electrode;

wherein the pixel electrode comprises a first light-transmitting area, a second light-transmitting area, a third light-transmitting area, and a fourth light-transmitting area arranged counterclockwise; and wherein the first alignment film corresponds to the second light-transmitting area and the third light-transmitting area of the pixel electrode in a vertically downward alignment direction, the first alignment film corresponds to the first light-transmitting area and the fourth light-transmitting area of the pixel electrode in a vertically upward alignment direction, the second alignment film corresponds to the first light-transmitting area and the second light-transmitting area of the pixel electrode in a horizontally leftward alignment direction, and the second alignment film corresponds to the third light-transmitting area and the fourth light-transmitting area of the pixel electrode in a horizontally rightward alignment direction.

2. The liquid crystal display panel as claimed in claim 1, wherein a width of the horizontal trunk electrode and the vertical trunk electrode is between 3 μm to 8 μm.

3. The liquid crystal display panel as claimed in claim 1, wherein a width of the branch electrode is between 2 μm to 4 μm.

4. The liquid crystal display panel as claimed in claim 1, wherein a distance between two adjacent branch electrodes which are located on the same light-transmitting area is between 2 μm to 4 μm.

5. The liquid crystal display panel as claimed in claim 1, further comprising a first polarizer and a second polarizer, wherein the first polarizer is disposed on the first substrate, and the second polarizer is disposed on the second substrate, and an angle between the first polarizer and the branch electrodes is 45 degrees.

6. The liquid crystal display panel as claimed in claim 5, wherein an angle between the first polarizer and the second polarizer is 90 degrees.

7. A liquid crystal display panel, comprising: a first substrate, a second substrate, a liquid crystal layer disposed between the first substrate and the second substrate, a first alignment film disposed between the first substrate and the liquid crystal layer, and a second alignment film disposed between the second substrate and the liquid crystal layer;

wherein a plurality of pixel electrodes are disposed on the first substrate, each of the pixel electrodes comprises a horizontal trunk electrode and a vertical trunk electrode, a pixel unit corresponding to the pixel electrode is divided into four light-transmitting areas through the horizontal trunk electrode and the vertical trunk electrode, and two adjacent light-transmitting areas have different alignment directions;

wherein the pixel electrode also comprises a plurality of branch electrodes disposed in the four light-transmitting areas, the branch electrodes are parallel to the horizontal trunk electrode or the vertical trunk electrode, so that the alignment direction in the light-transmitting area is parallel to the branch electrodes in the light-transmitting area;

wherein the pixel electrode comprises a first light-transmitting area, a second light-transmitting area, a third light-transmitting area, and a fourth light-transmitting area arranged counterclockwise; and wherein the first alignment film corresponds to the second light-transmitting area and the third light-transmitting area of the pixel electrode in a vertically downward alignment direction, the first alignment film corresponds to the first light-transmitting area and the fourth light-transmitting area of the pixel electrode in a vertically upward alignment direction, the second alignment film corresponds to the first light-transmitting area and the second light-transmitting area of the pixel electrode in a horizontally leftward alignment direction, and the second alignment film corresponds to the third light-transmitting area and the fourth light-transmitting area of the pixel electrode in a horizontally rightward alignment direction.

8. The liquid crystal display panel as claimed in claim 7, wherein the branch electrodes of the two adjacent light-transmitting areas are perpendicular to each other.

9. The liquid crystal display panel as claimed in claim 7, wherein ends of the branch electrodes in the same light-transmitting area are connected together to the vertical trunk electrode or the horizontal trunk electrode.

10. The liquid crystal display panel as claimed in claim 7, wherein a width of the horizontal trunk electrode and the vertical trunk electrode is between 3 μm to 8 μm.

11. The liquid crystal display panel as claimed in claim 7, wherein a width of the branch electrode is between 2 μm to 4 μm.

12. The liquid crystal display panel as claimed in claim 7, wherein a distance between two adjacent branch electrodes which are located in the same light-transmitting area is between 2 μm to 4 μm.

13. The liquid crystal display panel as claimed in claim 7, further comprising a first polarizer and a second polarizer, wherein the first polarizer is disposed on the first substrate, and the second polarizer is disposed on the second substrate, and an angle between the first polarizer and the branch electrodes is 45 degrees.

14. The liquid crystal display panel as claimed in claim 13, wherein an angle between the first polarizer and the second polarizer is 90 degrees.

15. A liquid crystal display device, comprising a liquid crystal display panel, wherein the liquid crystal display panel comprises a first substrate, a second substrate, a liquid crystal layer disposed between the first substrate and the second substrate, a first alignment film disposed between the first substrate and the liquid crystal layer, and a second alignment film disposed between the second substrate and the liquid crystal layer;

wherein a plurality of pixel electrodes are disposed on the first substrate, each of the pixel electrodes comprises a horizontal trunk electrode and a vertical trunk electrode, a pixel unit corresponding to the pixel electrode is divided into four light-transmitting areas through the horizontal trunk electrode and the vertical trunk electrode, and two adjacent light-transmitting areas have different alignment directions;

wherein the pixel electrode also comprises a plurality of branch electrodes disposed in the four light-transmitting areas, the branch electrodes are parallel to the horizontal trunk electrode or the vertical trunk electrode, so that the alignment direction in the light-transmitting area is parallel to the branch electrodes in the light-transmitting area;

wherein the pixel electrode comprises a first light-transmitting area, a second light-transmitting area, a third light-transmitting area, and a fourth light-transmitting area arranged counterclockwise; and wherein the first alignment film corresponds to the second light-transmitting area and the third light-transmitting area of the pixel electrode in a vertically downward alignment direction, the first alignment film corresponds to the first light-transmitting area and the fourth light-transmitting area of the pixel electrode in a vertically upward alignment direction, the second alignment film corresponds to the first light-transmitting area and the second light-transmitting area of the pixel electrode in a horizontally leftward alignment direction, and the second alignment film corresponds to the third light-transmitting area and the fourth light-transmitting area of the pixel electrode in a horizontally rightward alignment direction.

16. The liquid crystal display device as claimed in claim 15, wherein the branch electrodes of the two adjacent light-transmitting areas are perpendicular to each other.

17. The liquid crystal display device as claimed in claim 15, wherein ends of the branch electrodes in the same light-transmitting area are connected together to the vertical trunk electrode or the horizontal trunk electrode.

* * * * *